(12) United States Patent
McLaughlin et al.

(10) Patent No.: US 9,047,510 B2
(45) Date of Patent: Jun. 2, 2015

(54) METHOD AND APPARATUS FOR DETERMINING INFORMATION CONCERNING THE IDENTITY OF AN INDIVIDUAL

(75) Inventors: James Andrew McLaughlin, Belfast (GB); John McCune Anderson, Holywood (GB); Kenneth Anthony Kearney, Strangford (GB)

(73) Assignee: INTELESENS LIMITED, Belfast (GB)

( * ) Notice: Subject to any disclaimer, the term of this patent is extended or adjusted under 35 U.S.C. 154(b) by 949 days.

(21) Appl. No.: 12/530,131

(22) PCT Filed: Mar. 7, 2008

(86) PCT No.: PCT/GB2008/000782
§ 371 (c)(1),
(2), (4) Date: Mar. 1, 2010

(87) PCT Pub. No.: WO2008/107684
PCT Pub. Date: Sep. 12, 2008

(65) Prior Publication Data
US 2010/0145202 A1      Jun. 10, 2010

(30) Foreign Application Priority Data
Mar. 8, 2007   (GB) .................................. 0704429.0

(51) Int. Cl.
*A61B 5/0452*   (2006.01)
*G06K 9/00*   (2006.01)
(52) U.S. Cl.
CPC .................................... *G06K 9/0053* (2013.01)
(58) Field of Classification Search
USPC ............................ 600/509, 516, 521; 382/115
See application file for complete search history.

(56) References Cited

U.S. PATENT DOCUMENTS

| 4,742,458 A | 5/1988 | Nathans et al. |
| 6,324,423 B1 | 11/2001 | Callahan et al. |

(Continued)

FOREIGN PATENT DOCUMENTS

| WO | WO-01/95246 A1 | 12/2001 |
| WO | WO-02/093461 A1 | 11/2002 |

(Continued)

OTHER PUBLICATIONS

Lena Biel et al., "ECG Analysis: A New Approach in Human Identification", from Jun. 3, 2001.

(Continued)

*Primary Examiner* — Tammie K Heller
(74) *Attorney, Agent, or Firm* — Christopher J. McKenna; Paul M. H. Pua; Foley & Lardner LLP

(57) ABSTRACT

A method of determining information concerning the identity of an individual comprising measuring at least one biometric of the individual comprising at least one bio-potential waveform generated by the individual's heart, extracting a plurality of characteristics from the bio-potential waveform comprising any of an approximate location of a point of a P peak, an approximate location of a Q-point of a QRS peak system, an approximate location of an R-point of a QRS peak system, an approximate location of an S-point of a QRS peak system, an approximate location of a point of a T peak, using the characteristics to calculate at least one waveform parameter, comparing at least one calculated waveform parameter with at least one previously-acquired waveform parameter to generate a score, and using the score to determine information concerning the identity of the individual.

19 Claims, 2 Drawing Sheets

(56) References Cited

U.S. PATENT DOCUMENTS

| | | |
|---|---|---|
| 6,993,378 B2 | 1/2006 | Wiederhold et al. |
| 2005/0281439 A1 | 12/2005 | Lange |
| 2006/0215883 A1 | 9/2006 | Kim et al. |
| 2006/0285660 A1 | 12/2006 | Brown |
| 2007/0177770 A1 | 8/2007 | Derchak et al. |

FOREIGN PATENT DOCUMENTS

| | | |
|---|---|---|
| WO | WO-03/000015 A2 | 1/2003 |
| WO | WO-2004/012388 A1 | 2/2004 |
| WO | WO-2006/048701 A2 | 5/2006 |

OTHER PUBLICATIONS

Steven A. Israel et. al., "ECG to Identify Individuals", The Journal of the Pattern Recognition Society, Oct. 22, 2003.

Search Report by UK Intellectual Property for App. No. GB0704429.0 from Jul. 6, 2007.

International Search Report for PCT/GB2008/000782, mailed on Jun. 30, 2008.

Written Opinion for PCT/GB2008/000782, mailed on Jun. 30, 2008.

International Preliminary Report on Patentability for PCT/GB2008/000782, mailed on Sep. 8, 2009.

Kyoso, Masaki, Development of an ECG Identification System. In Proceedings of the 23rd Annual International Conference of the IEEE Engineering in Medicine and Biology Society (EMBS), published 2001, pp. 3721-3723, vol. 4, held in Istanbul, Turkey, Oct. 25-28, 2001.

Kim, KS et al, A robust human identification by normalized time-domain features of Electrocardiogram. In Proceedings of the 27th Annual International Conference of the IEEE Engineering in Medicine and Biology Society (EMBS), published 2006, pp. 1114-1117, held in Shanghai, China, Sep. 1-4, 2005.

METHOD AND APPARATUS FOR DETERMINING INFORMATION CONCERNING THE IDENTITY OF AN INDIVIDUAL

The invention relates to a method and apparatus for determining information concerning the identity of an individual using a biometric of the individual.

The science of biometric measurement refers to 'automated' methods used to identify an individual, either human or animal, based upon one or more of the individual's physiological or behavioural characteristics. Physiological characteristics that have been used as biometrics include fingerprints, face, hand and finger geometry, iris and retina geometry, vein patterns and DNA make-up. Behavioural characteristics that have been used as biometrics include handwriting, voice and gait properties, and keystroke dynamics.

Measurement of such biometrics has been used to provide information on an individual's identity for some time, in a variety of fields. Biometric measurements, such as fingerprints and DNA, have been used in criminological identification. Biometric measurements, such as hand geometry, iris/retinal geometry and voice properties, have been used in access control systems, for identification of individuals to allow, for example, access to buildings and equipment such as computers. However, a number of problems have been encountered with existing biometric measurement techniques, for example, inaccuracy, poor discrimination between individuals, ease of forgery, slowness of result, and high cost. This has resulted in limited adoption of many of these techniques into high security markets. A need exists for a biometric measurement system and method which addresses at least some of these issues.

Bio-potential waveforms, for example in the form of electrocardiograms (ECGs), are generated by the electrical activity of an individual's heart. Such waveforms have been used for some time in the assessment and management of an individual's health. The details of bio-potential waveforms vary from individual to individual, according to, for example, variations in heart morphology, orientation, ion paths, blockages etc. It has been recognised that bio-potential waveforms therefore offer potential as a biometric for providing information concerning the identity of an individual.

According to a first aspect of the invention there is provided a method of determining information concerning the identity of an individual comprising measuring at least one biometric of the individual comprising at least one bio-potential waveform generated by the individual's heart, extracting a plurality of characteristics from the bio-potential waveform comprising any of an approximate location of a point of a P peak, an approximate location of a Q-point of a QRS peak system, an approximate location of an R-point of a QRS peak system, an approximate location of an S-point of a QRS peak system, an approximate location of a point of a T peak, using the characteristics to calculate at least one waveform parameter comprising any of an approximate location of an R-point minus an approximate location of a mid-point of a P peak, an approximate location of a mid-point of a T peak minus an approximate location of an R-point, an approximate location of an S-point minus an approximate location of an R-point, an approximate location of an R-point minus an approximate location of a Q-point, (an amplitude at an S-point minus an amplitude at an R-point) divided by (an amplitude at an approximate mid-point of a T peak minus an amplitude at an R-point), (an amplitude at an S-point minus an amplitude at an R-point) divided by (an amplitude at an approximate mid-point of a P peak minus an amplitude at an R-point), (an amplitude at a Q-point minus an amplitude at an R-point) divided by (an amplitude at an approximate mid-point of a P peak minus an amplitude at an R-point), (an amplitude at a Q-point minus an amplitude at an R-point) divided by (an amplitude at an S-point minus an amplitude at an R-point), comparing at least one calculated waveform parameter with at least one previously-acquired waveform parameter to generate a score, and using the score to determine information concerning the identity of the individual.

Measuring the biometric of the individual may comprise detecting the at least one bio-potential waveform using at least one electrode in contact with a portion of the individual. Detecting the at least one bio-potential waveform may comprise using two electrodes, a first electrode in contact with a first portion of the individual, and a second electrode in contact with a second portion of the individual. A first electrode may be in contact with a first portion of the chest area of the individual, and a second electrode may be in contact with a second portion of the chest area of the individual. A first electrode may be in contact with a portion of a first limb of the individual, and a second electrode may be in contact with a portion of a second limb of the individual. A first electrode may be in contact with a portion of a wrist of a first arm of the individual, and a second electrode may be in contact with a portion of a hand, e.g. a finger, of a second arm of the individual. Detecting the at least one bio-potential waveform may comprise using more than two electrodes. This would improve the resolution of the measured biometric.

The at least one bio-potential waveform may comprise at least part of an electrocardiogram (ECG).

The method may comprise measuring a plurality of biometrics of the individual, each comprising at least one bio-potential waveform generated by the individual's heart. The method may comprise using at least one of the biometrics to scale each remaining biometric. The scaling may comprise analysing the biometrics to determine a scaling biometric having a maximum waveform amplitude and a minimum waveform amplitude of the waveforms of the biometrics, and scaling each remaining biometric to the scaling biometric using the maximum and minimum waveform amplitudes of the scaling biometric. The method may comprise extracting a plurality of characteristics from a bio-potential waveform of each of the biometrics. The method may comprise using the characteristics of each biometric to calculate at least one waveform parameter for each biometric. The method may comprise determining a representative waveform parameter of corresponding waveform parameters for each of the biometrics, and comparing the representative waveform parameter with at least one previously-acquired waveform parameter to generate a score.

The characteristics extracted from the bio-potential waveform may comprise an approximate location of a mid-point of a P peak. The characteristics extracted from the bio-potential waveform may comprise an approximate location of a start-point of a P peak. The characteristics extracted from the bio-potential waveform may comprise an approximate location of an end-point of a P peak. The characteristics extracted from the bio-potential waveform may comprise an approximate location of a mid-point of a T peak. The characteristics extracted from the bio-potential waveform may comprise an approximate location of a start-point of a T peak. The characteristics extracted from the bio-potential waveform may comprise an approximate location of an end-point of a T peak.

The approximate location of a Q-point may comprise an approximate location of a start-point of a QRS peak system. The approximate location of an R-point may comprise an approximate location of a mid-point of an R peak of a QRS peak system. The approximate location of an S-point may comprise an approximate location of an end-point of a QRS peak system.

The characteristics of the bio-potential waveform may further comprise any of an approximate location of a start-point of a P peak, an approximate location of an end-point of a P peak, an approximate location of a start-point of a T peak, an approximate location of a start-point of a T peak, an interval between characteristics, an area of a peak, a full width at half maximum (FWHM) of a peak, a slope of a peak, a rise-time of a peak, a fall-time of a peak, a reflection of a peak, a DC off-set of the waveform, a drift of the waveform, a signal to noise ratio of the waveform, an artefact of the waveform.

The at least one calculated waveform parameter may be compared with a plurality of previously-acquired waveform parameters of an individual to generate a score. The at least one calculated waveform parameter may be compared with a plurality of previously-acquired waveform parameters of one or more of a plurality of individuals to generate a score. In this case, the at least one calculated waveform parameter may be compared with a plurality of previously-acquired waveform parameters of a first individual to generate a score, and a second individual to generate a score, etc., as necessary until a match is found between the individual and one of the plurality of individuals.

Using the score may comprise comparing the score with a pre-set score threshold to determine information concerning the individual. When a plurality of waveform parameters are calculated, using the score may comprise summing the scores for the waveform parameters, and comparing the aggregate score with a pre-set score threshold to determine information concerning the individual.

When a plurality of waveform parameters are calculated, the method may comprise comparing a first calculated waveform parameter with at least one corresponding previously-acquired waveform parameter to generate a first score and using the first score to determine information concerning the individual, assessing the determined information, and if the determined information matches required information, terminating the method, or if the determined information does not match required information, comparing a second calculated waveform parameter with at least one corresponding previously-acquired waveform parameter to generate a second score and using the second score to determine information concerning the individual, or using the first and second scores to determine information concerning the individual, and continuing until either the determined information matches required information or each of the waveform parameters has been used.

The at least one previously-acquired waveform parameter may have been obtained from a previously-acquired heart bio-potential biometric of the individual, and comparing the score or the aggregate score with a pre-set score threshold may determine that the individual is the individual who provided the at least one previously-acquired waveform parameter.

The at least one previously-acquired waveform parameter may have been obtained from a previously-acquired heart bio-potential biometric of a register individual, and comparing the score or the aggregate score with a pre-set score threshold may determine that the individual is the register individual or is not the register individual.

Previously-acquired waveform parameters may have been obtained from each of a plurality of previously-acquired heart bio-potential biometrics of a plurality of register individuals, and comparing the score or the aggregate score with a pre-set score threshold may determine that the individual is one of the register individuals or is not one of the register individuals.

For the or each calculated waveform parameter, the method may comprise determining a median of a plurality of calculations of the waveform parameter, and comparing the median of the or each waveform parameter with at least one corresponding previously-acquired waveform parameter to generate a score. For the or each calculated waveform parameter, the method may comprise determining a median of a plurality of calculations of the waveform parameter, and comparing the median of the or each waveform parameter with a plurality of corresponding previously-acquired waveform parameters to generate a score. For the or each waveform parameter, this may comprise calculating the difference between the median of the calculated waveform parameter and the mean of the plurality of corresponding previously-acquired waveform parameters and dividing the result by the standard deviation of the plurality of corresponding previously-acquired waveform parameters.

According to a second aspect of the invention there is provided an identification apparatus for determining information concerning the identity of an individual comprising a measurement device which measures at least one biometric of the individual comprising at least one bio-potential waveform generated by the individual's heart, and an analysis system comprising an analysis device which analyses the bio-potential waveform to extract a plurality of characteristics from the bio-potential waveform comprising any of an approximate location of a point of a P peak, an approximate location of a Q-point of a QRS peak system, an approximate location of an R-point of a ORS peak system, an approximate location of an S-point of a ORS peak system, an approximate location of a point of a T peak, a calculation device which uses the characteristics to calculate at least one waveform parameter comprising any of an approximate location of an R-point minus an approximate location of a mid-point of a P peak, an approximate location of a mid-point of a T peak minus an approximate location of an R-point, an approximate location of an S-point minus an approximate location of an R-point, an approximate location of an R-point minus an approximate location of a Q-point, (an amplitude at an S-point minus an amplitude at an R-point) divided by (an amplitude at an approximate mid-point of a T peak minus an amplitude at an R-point), (an amplitude at an S-point minus an amplitude at an R-point) divided by (an amplitude at an approximate mid-point of a P peak minus an amplitude at an R-point), (an amplitude at a Q-point minus an amplitude at an R-point) divided by (an amplitude at an approximate mid-point of a P peak minus an amplitude at an R-point), (an amplitude at a Q-point minus an amplitude at an R-point) divided by (an amplitude at an S-point minus an amplitude at an R-point), a comparator which compares at least one calculated waveform parameter with at least one previously-acquired waveform parameter to generate a score, and uses the score to determine information concerning the identity of the individual.

The measurement device may comprise two electrodes, a first electrode adapted to be placed in contact with a first portion of the individual, and a second electrode adapted to be placed in contact with a second portion of the individual. The measurement device may comprise an electrocardiograph.

According to a third aspect of the invention there is provided a ECG acquisition/analysis device comprising an identification apparatus according to the second aspect of the invention.

According to a fourth aspect of the invention there is provided a tracking device comprising an identification apparatus according to the second aspect of the invention.

Embodiments of the invention will now be described by way of example only, with reference to the accompanying drawings, in which.

Figure 1:
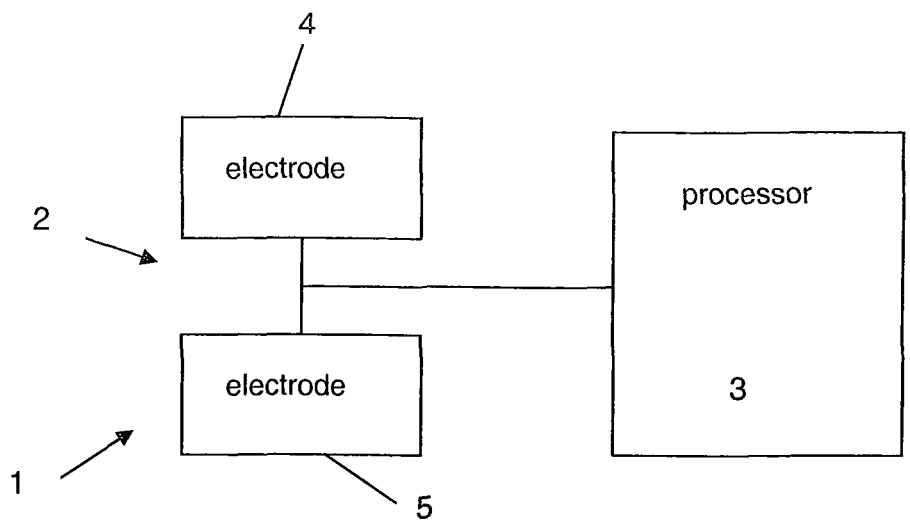
FIG. 1 is a schematic representation of a first embodiment of the identification apparatus of the invention.

FIG. 1 illustrates a generalised representation of the identification apparatus of the invention, which operates using the method of the invention. This comprises an apparatus 1, which when used by an individual, determines information concerning the identity of the individual. In a basic form, the identification apparatus 1 comprises a measurement device 2, and an analysis system 3. The measurement device comprises a first electrode 4 and a second electrode 5. It will appreciated that other numbers of electrodes may be used, for example one, three, four, six or twelve electrodes. The electrodes 4, 5 are fabricated using low impedance methods, from materials such as silver-silver chloride, have enhanced surface area, and may be printed, metal formed, foil etc. The electrodes 4, 5 are in electrical contact with each other, and, in use, are in contact with portions of the individual to measure a biometric of the individual comprising at least one bio-potential waveform generated by the electrical activity of the individual's heart. The electrodes may be wet or dry electrodes. The electrodes may be in direct contact with the individual, or a hydrogel electrolyte interface may be provided between the electrodes and the individual.

The analysis system 3 comprises a processor. This receives the measurement of the biometric from the electrodes 4, 5, and analyses the biometric to determine information concerning the identity of the individual. The apparatus 1 may further comprise an output device (not shown). This may comprise, for example, a radio transmitter, and may receive the information concerning the identity of the individual from the analysis means 3, and output this to, for example, a remote receiver. The apparatus 1 may further comprise an input device, for receiving, for example, commands from an external device.

The measurement device 2 and the analysis system 3 (and output and input devices) may be provided in the same device, or may be provided remote from each other, and be connected to each other for example by wire or wirelessly. Further, the analysis system 3 may be provided in one element, or in multiple elements. For example, the analysis means 3 could comprise a comparator provided remotely from the remainder of the analysis system.

The electrodes 4, 5 of the measurement device 2 may both be generally in contact with portions of an individual, when the apparatus 1 is being used by the individual. The measurement device 2 may be configured to continuously measure a biometric of the individual, or to periodically measure a biometric of the individual. The measurement device 2 may be prompted to measure a biometric of the individual by, for example, the analysis system 3, or an external device.

Alternatively, only a first electrode of the measurement device 2 may be generally in contact with a portion of the individual, when the apparatus 1 is being used by the individual, and the second electrode may be periodically brought into contact with a portion of the individual. The apparatus 1 may periodically prompt the individual to contact the second electrode, by, for example emitting audio and/or visual signals. The measurement device 2 may be configured to measure a biometric of the individual, on each or some of the occasions when both electrodes are in contact with portions of the individual. The measurement device 2 may be prompted to measure a biometric of the individual by, for example, the analysis system 3, or an external device.

The measurement device 2 may measure one or more biometrics of the individual, each comprising one or more bio-potential waveforms. The or each of the bio-potential waveforms may comprise at least part of an electrocardiogram (ECG). Preferably, seven biometrics are measured, each being measured for approximately 4 seconds and comprising at least one, but normally more, bio-potential waveforms. It will be appreciated that more or less biometrics may be measured, for example, 2 to 30, or 10 or more biometrics may be measured. It will also be appreciated that the duration of measurement of each biometric may be more or less.

Figure 2:
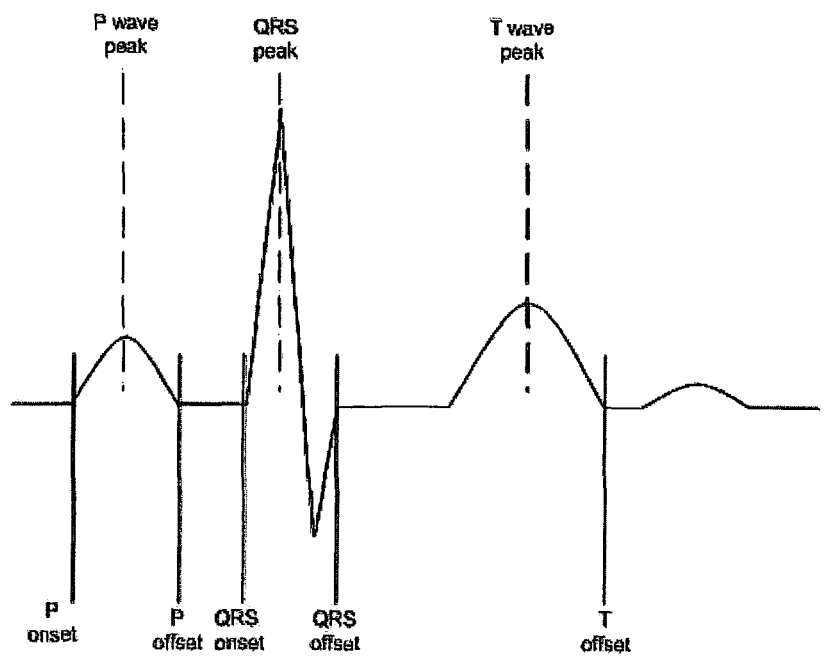
FIG. 2 is a schematic representation of an idealised bio-potential waveform generated by an individual's heart.

Each biometric measurement, comprising one or more bio-potential waveforms, is passed to the analysis system 3. An example of an idealised bio-potential waveform is illustrated in FIG. 2. This comprises a P peak of the waveform, a QRS peak system of the waveform, and a T peak of the waveform. Each of the P and T peaks has an approximate start-point (onset), an approximate mid-point (peak) and an approximate end-point (offset), as shown. The QRS peak system has an approximate start-point (onset), and an approximate end-point (offset), as shown.

Each biometric measurement of the individual may be scaled using at least one of the biometric measurements. The scaling may comprise analysing the biometrics to determine a scaling biometric which has a maximum waveform amplitude and a minimum waveform amplitude of all the waveforms of the biometrics, and scaling each remaining biometric to the scaling biometric using the maximum and minimum waveform amplitudes of the scaling biometric.

For each of the seven biometrics, the analysis system 3 analyses the biometric, and selects the first full bio-potential waveform in the biometric. The analysis system 3 then extracts a plurality of characteristics from the selected bio-potential waveform. The characteristics comprise any of an approximate location of a point of a P peak, an approximate location of a Q-point of a QRS peak system, an approximate location of an R-point of a QRS peak system, an approximate location of an S-point of a QRS peak system, an approximate location of a point of a T peak. The point of the P peak or the T peak may be a mid-point, a start-point or an end-point of the peak.

The approximate location of a Q-point comprises an approximate location of a start-point of a QRS peak system. The approximate location of an R-point comprises an approximate location of a mid-point of an R peak of a QRS peak system. The approximate location of an S-point comprises an approximate location of an end-point of a QRS peak system. The characteristics of the selected bio-potential waveform extracted by the analysis system 3, may further comprise any of an approximate location of a start-point of a P peak, an approximate location of an end-point of a P peak, an approximate location of a start-point of a T peak, an approximate location of a start-point of a T peak, an interval between characteristics, an area of a peak, a full width at half maximum (FWHM) of a peak, a slope of a peak, a rise-time of a peak, a fall-time of a peak, a reflection of a peak, a DC off-set of the waveform, a drift of the waveform, a signal to noise ratio of the waveform, an artefact of the waveform.

The approximate location of the Q-point, R-point, and S-point of the QRS peak system, and the points of the P peak and the T peak of each waveform, may be found using any of a number of peak fitting techniques. This may improve the accuracy of extracting the approximate locations.

For each of the seven biometrics, the analysis system 3 then uses the extracted characteristics of the selected bio-potential waveform of the biometric to calculate at least one waveform parameter of the biometric. The calculated waveform parameters comprise any of the following:

approximate location of an R-point minus approximate location of a mid-point of a P peak approximate location of a mid-point of a T peak minus approximate location of an R-point approximate location of an S-point minus approximate location of an R-point approximate location of an R-point minus approximate location of a Q-point (an amplitude at an S-point minus amplitude at an R-point) divided by (an amplitude at an approximate mid-point of a T peak minus amplitude at an R-point)

(an amplitude at an S-point minus an amplitude at an R-point) divided by (an amplitude at an approximate mid-point of a P peak minus an amplitude at an R-point)

(an amplitude at a Q-point minus an amplitude at an R-point) divided by (an amplitude at an approximate mid-point of a P peak minus amplitude at an R-point)

(an amplitude at a Q-point minus an amplitude at an R-point) divided by (an amplitude at an S-point minus an amplitude at an R-point).

These may be written as:

$R_{location} - P_{location}$
$T_{location} - R_{location}$
$S_{location} - R_{location}$
$R_{location} - Q_{location}$ where $P_{location}$ is an approximate location of a mid-point of the P peak of the waveform, $Q_{location}$ is an approximate location of the Q-point of the waveform, $R_{location}$ is an approximate location of the R-point of the waveform, $T_{location}$ is an approximate location of a mid-point of the T peak of the waveform, and $S_{location}$ is an approximate location of the S-point of the waveform, and abs $(S_{amplitude} - R_{amplitude})$/abs $(T_{amplitude} - R_{amplitude})$
abs $(S_{amplitude} - R_{amplitude})$/abs $(P_{amplitude} - R_{amplitude})$
abs $(Q_{amplitude} - R_{amplitude})$/abs $(P_{amplitude} - R_{amplitude})$
abs $(Q_{amplitude} - R_{amplitude})$/abs $(S_{amplitude} - R_{amplitude})$ where $P_{amplitude}$ is an amplitude at an approximate mid-point of the P peak of the waveform, $Q_{amplitude}$ is an amplitude at the Q-point of the waveform, $R_{amplitude}$ is an amplitude at the R-point of the waveform, $S_{amplitude}$ is an amplitude at the S-point of the waveform, and $T_{amplitude}$ is an amplitude at an approximate mid-point of the T peak of the waveform.

These eight waveform parameters have been identified as being the most unique and easily measured parameters of bio-potential waveforms, and provide optimum identification of and discrimination between individuals. The number of relative parameters calculated by the analysis system 3 can vary, depending on, for example, the application in which the identification apparatus 1 is to be used, a desired level of identification of an individual using the identification apparatus, a desired level of discrimination between different individuals using the identification apparatus, a desired speed of operation of the identification apparatus.

The higher the number of waveform parameters which are calculated, the greater the level of identification and discrimination will be, but this will also decrease the speed of operation of the identification apparatus.

Each of the latter four waveform parameters referred to above, is normalised by dividing by a third amplitude of the waveform minus a fourth amplitude of the waveform. This allows some compensation for any change in the shape of the waveforms of the measured biometrics, due, for example, to heart-beat variability of the individual using the identification apparatus.

The eight waveform parameters referred to above, are calculated for each of the seven biometrics measured for the individual, i.e. seven calculations of each of the eight waveform parameters are obtained. For each waveform parameter, a median of the seven calculations thereof is taken. This allows some compensation for the possibility of measuring spurious waveforms.

For each of the eight calculated waveform parameters, the analysis system 3 then compares the median of the calculated waveform parameter with at least one corresponding previously-acquired waveform parameter to generate a score.

The plurality of previously-acquired waveform parameters may be received by the identification apparatus 1 via the input device when provided, or may be stored in the analysis system 3.

In a first operational embodiment of the identification apparatus 1, each of the eight calculated waveform parameters is compared with a plurality of corresponding previously-acquired waveform parameters of the individual now using the identification apparatus 1, to generate a score. Each corresponding waveform parameter has previously been acquired from one or more previously-measured heart biopotential biometrics of the individual now using the identification apparatus. The or each previously-measured biometric may have been previously measured and analysed by a different apparatus and stored in the identification apparatus 1, or preferably has been previously measured and analysed by the identification apparatus 1 and stored therein, i.e. the individual may have pre-registered with the identification apparatus 1. Preferably, twenty biometrics are previously acquired for the individual and stored in the identification apparatus. Each of the twenty previously-acquired biometrics is analysed to determine the corresponding previously-acquired waveform parameters referred to above. For each of the corresponding previously-acquired waveform parameters, a mean and standard deviation is then obtained and stored. For each of the eight waveform parameters, a score is then determined by subtracting the median of the calculated waveform parameter from the mean corresponding previously-acquired waveform parameter and dividing the result by the standard deviation of the corresponding previously-acquired waveform parameter. Thus the score depends on the number of standard deviations the median calculated waveform parameter is away from the mean corresponding previously-acquired waveform parameter. The analysis means 3 then sums the scores generated for each of the eight waveform parameters, and uses the aggregate score to determine information concerning the identity of the individual using the identification apparatus 1. This is achieved by comparing the aggregate score with a pre-set score threshold, to determine whether the aggregate score is less than or equal to/greater than the pre-set score threshold. As the individual now using the identification apparatus 1 is the same individual from whom the previously-acquired waveform parameters were obtained, the deviation between each of the calculated waveform parameters and the corresponding previously-acquired waveform parameters will be small, generating small scores. The aggregate score will then be below the pre-set score threshold, and the analysis system 3 will determine information concerning the identity of the individual using the identification apparatus 1, which comprises the information that the individual now using the identification apparatus 1 is the individual that pre-registered with the identification apparatus 1.

In a second operational embodiment of the identification apparatus 1, each of the eight calculated waveform parameters is compared with a plurality of corresponding previously-acquired waveform parameters of one or more of a plurality of individuals who have previously registered with the identification apparatus 1, to generate a score. Again, the corresponding waveform parameters for each individual have previously been acquired from one or more previously-measured heart bio-potential biometrics of the individual, preferably previously measured and analysed by the identification apparatus 1 and stored therein or externally. Preferably, twenty biometrics are previously acquired for each individual and stored in a database, which may in the identification apparatus 1, or held externally to the apparatus. Each of the twenty previously-acquired biometrics of each individual is analysed to determine the corresponding previously-acquired waveform parameters referred to above, and these are stored in the database. For each individual, a mean and standard deviation of each of the corresponding previously-acquired waveform parameters is then obtained and also stored in the database. For each individual, an identification element, such as a PIN, may also be stored in the database, and associated with the biometrics, waveform parameters and mean and standard deviation of the waveform parameters of the individual. Scores can then be determined and used to obtain information concerning the identity of the individual using the identification apparatus 1, as follows.

The individual using the identification apparatus 1 enters an identification element, such as a PIN, into the apparatus 1. The analysis system 3 uses the identification element to search the database. If a corresponding identification element is found, the analysis system extracts at least the mean and standard deviation of the previously-acquired waveform parameters associated with the identification element. Each of the median calculated waveform parameters determined for the individual using the identification apparatus 1 as above, is then compared with a corresponding previously-acquired waveform parameter by subtracting the median of the calculated waveform parameter from the mean corresponding previously-acquired waveform parameter extracted from the database and dividing the result by the standard deviation of the corresponding previously-acquired waveform parameter extracted from the database, to generate a score. The analysis means 3 then sums the scores generated for each of the waveform parameters, and uses the aggregate score to determine information concerning the identity of the individual using the identification apparatus 1. This is again achieved by comparing the aggregate score with a pre-set score threshold, to determine whether the aggregate score is less than or equal to/greater than the pre-set score threshold. If the individual now using the identification apparatus 1 is the individual from whom the previously-acquired waveform parameters were obtained (i.e. the individual using the apparatus is entitled to use the identification element), the deviation between each of the calculated waveform parameters and the corresponding previously-acquired waveform parameters will be small, generating small scores. The aggregate score will then be below the pre-set score threshold, and the analysis system 3 will determine information concerning the identity of the individual using the identification apparatus 1, which comprises the information that the individual now using the identification apparatus 1 has previously registered with the identification apparatus 1 and is entitled to use the identification element. The analysis system 3 stores the biometric details (waveform characteristics, parameters, etc.) which have been measured for the individual in the database, overwriting the oldest previously-acquired biometric details of the individual. In this way, the biometric details held for an individual are kept up-to-date, and any subtle changes in the biometric of the individual over time are logged.

If the individual now using the identification apparatus 1 is not the individual from whom the previously-acquired waveform parameters were obtained (i.e. the individual using the apparatus is not entitled to use the identification element, e.g. the element may have been unlawfully obtained), the deviation between each of the calculated waveform parameters and the corresponding previously-acquired waveform parameters will not be small, generating relatively large scores. The aggregate score will then be above the pre-set score threshold, and the analysis system 3 will determine information concerning the identity of the individual using the identification apparatus 1, which comprises the information that the individual now using the identification apparatus 1 is not entitled to use the identification element.

If the analysis system 3 uses the identification element to search the database, and a corresponding identification element is not found, the identification apparatus 1 registers the individual. This comprises measuring preferably eight biometrics each for 30 seconds. For each biometric, the analysis system 3 extracts the characteristics of a bio-potential waveform thereof and calculates the waveform parameters, as above. The mean and standard deviation of each waveform parameter is then determined. These are all stored in the database, and associated with the identification element which the individual entered into the apparatus 1.

In an alternative operational mode, the individual need not enter an identification element into the identification apparatus 1. On measuring the biometric for the individual using the apparatus, the analysis system 3 calculates the median for each of the waveform parameters, as before. The analysis system 3 then extracts at least the mean and standard deviation of previously-acquired waveform parameters for a first individual, from the database. The median of each of the calculated waveform parameters is then compared with a corresponding one of the previously-acquired waveform parameters, by subtracting the median of the calculated waveform parameter from the mean corresponding previously-acquired waveform parameter extracted from the database and dividing the result by the standard deviation of the corresponding previously-acquired waveform parameter extracted from the database, to generate a score. The analysis means 3 then sums the scores generated for each of the waveform parameters, and uses the aggregate score to determine information concerning the identity of the individual using the identification apparatus 1. This is achieved by comparing the aggregate score with a pre-set score threshold, to determine whether the aggregate score is less than or equal to/greater than the pre-set score threshold. If the individual now using the identification apparatus 1 matches the first individual, the deviation between each of the calculated waveform parameters and the corresponding previously-acquired waveform parameters will be small, generating small scores. The aggregate score will then be below the pre-set score threshold, and the analysis system 3 will determine information concerning the identity of the individual using the identification apparatus 1, which comprises the information that the individual now using the identification apparatus 1 matches the first individual. If the individual now using the identification apparatus 1 does not match the first individual, the deviation between each of the calculated waveform parameters and the corresponding previously-acquired waveform parameters will not be small, generating relatively large scores. The aggregate score will then be above the pre-set score threshold, and the analysis system 3 will determine information concerning the identity of the individual using the identification apparatus 1, which comprises the information that the individual now using the identification apparatus 1 does not match the first individual. The analysis system 3 then extracts at least the mean and standard deviation of previously-acquired waveform parameters for a second individual, from the database. The above comparison process is then carried out, to determine whether or not the individual now using the identification apparatus 1 matches the second individual. This process is repeated until either a match between the individual now using the identification apparatus 1 and one of the individual whose biometrics are stored in the database is found, or a comparison is made to all of the individuals whose biometrics are stored in the database, and no match for the individual now using the identification apparatus 1 is found.

Biometric details for a large number of individuals may be stored in the database. However, this will increase the time taken for the analysis system 3 to search for a corresponding identification element, or to compare The identification apparatus 1 may be used in a variety of applications, and may comprise one or more further components, or may be incorporated into one or more devices, which use the information concerning the identity of the individual determined by the analysis system 3.

The identification apparatus 1 may be used as or in an identification device. This may store details of the identity of an individual that has previously registered with the apparatus 1 and provides the previously-acquired waveform parameters. When the analysis system 3 determines that the individual now using the apparatus 1 is the individual that previously registered with the apparatus 1, the details of the individual's identity may be output by the identification apparatus.

Figure 3:
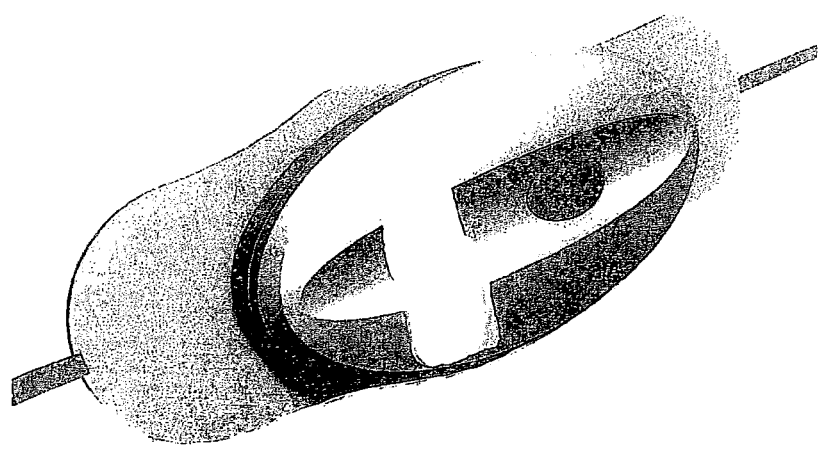
FIG. 3 is a schematic representation of a ECG acquisition/analysis device incorporating the identification apparatus of the invention.

The identification apparatus, or at least the analysis system 3 thereof, may be incorporated into a ECG acquisition/analysis device, as shown in FIG. 3. This comprises electrodes which measure the ECG. The ECG signals are used to identify the individual using the device, as above. The device then outputs both the ECG signals of the individual and the identity of the individual, allowing increased matching of ECG signals with the individual producing them. If the ECG acquisition/analysis device is removed, this will cause the identification apparatus to measure a disconnect signal, which is significantly different to that of the individual's ECG signals. The apparatus may calculate a score using the disconnect signal and compare this to a pre-set score threshold. The calculated score may be above the pre-set score threshold, and this may cause the identification apparatus to generate an alarm.

The ECG signals of the individual using the ECG acquisition/analysis device may undergo a significant change, for example if the individual starts to take medication or has a heart attack. The identification apparatus may recognise that a change has occurred or be instructed that a change has occurred, and measure and store a plurality of the changed ECG signals. Subsequently, when a measurement of the individual's ECG is to be taken, compared with previously-acquired ECG signals for identification of the individual, and the ECG measurement and identity output, these changed ECG signals can be used as the previously-acquired ECG signals. Thus the identification apparatus is able to re-learn an individual's ECG signal signature, and maintain identification of an individual even if the ECG signals from the individual undergo a significant change. The identification apparatus may re-learn the an individual's ECG signal signature any number of times, as required.

The identification apparatus may be used as a heart monitoring device. This may output one or more heart bio-potential waveforms of an individual and details of the identity of the individual, allowing the condition of the individual's heart to be monitored.

The identification apparatus 1 may be used with or comprise a plurality of devices, that use the details of the identity of the individual. For example, the identification apparatus may be used with or comprise one or more sensor devices which sense one or more attributes of the individual, and details of the attributes and the identity of the individual producing them may be output. The identification apparatus may be used with or comprise a stress detector which is able to measure stress levels of the individual. The identification apparatus can provide an output comprising the details of the identity of the individual and the stress levels of the individual, to, for example, a remote receiver accessible by, for example, a doctor or an employer, etc.

The identification apparatus 1 may be used as or in a system which uses the determination that the individual now using the apparatus 1 is an individual that previously registered with the apparatus, without requiring knowledge of the actual identity of the individual. For example, the identification apparatus 1 may be used as or in an access system, which when the determination that the individual now using the apparatus is an individual that previously registered with the apparatus is received, grants access to the individual, for example, to a building or a piece of equipment, e.g. a computer.

The identification apparatus 1 may be used as or in a tracking device. This may further comprise a location sensor, such as a global positioning system (GPS) location sensor. The location sensor is able to continually sense, or sense on demand, the location of the tracking device. When the apparatus 1 determines that the individual now using the apparatus is an individual that previously registered with the apparatus, details of the location of the tracking device may be output. The tracking device may comprise a proximity sensor, able to detect if the sensor is within a set range of a base station. When the identification apparatus 1 determines that the individual now using the apparatus is an individual that previously registered with the apparatus, details of whether or not the tracking device is within the set range of the base station may be output. The tracking device may further comprise an alarm device, comprising a sensing device. The sensing device is able to continually sense, or sense on demand, whether or not the identification apparatus 1 is being worn by the individual, and if the apparatus is not being worn by the individual, emit an alarm signal. The sensing device may use feedback from the electrodes of the measuring device of the identification apparatus 1, to sense whether or not the identification apparatus 1 is being worn by the individual.

It will be appreciated that the identification apparatus 1 may be used by an individual, human or animal, in a variety of wide ranging applications, for example tracking applications, e.g. for children, medical patients (particularly babies), criminals, identification applications, e.g. identifying medical patients, security applications, e.g. banking, and numerous other applications.

Using the identification apparatus 1, one or more heart bio-potential biometrics of one or more individuals are measured and analysed, in real time. This biometric has been found to have characteristics that are different from one individual to the next. This has now been confirmed in very large groups of individuals. The suitability of using this biometric in a method of determining information concerning the identity of an individual, has been confirmed. The method has been found to provide a high level of discrimination between individuals. A discrimination factor (DF) of the method may be defined as the percentage of individuals that are correctly identified from a random set of individuals. For example if 15 individuals are identified out of a sample of 20 known individuals, this is described as a DF20 of 75% (or 0.75).

As the heart bio-potential biometric being measured in the method of the invention originates from within an individual's body, this is difficult to forge, as can be the case in iris recognition based systems, or tampered with, as can be the case for fingerprint based systems.

Figure 4:
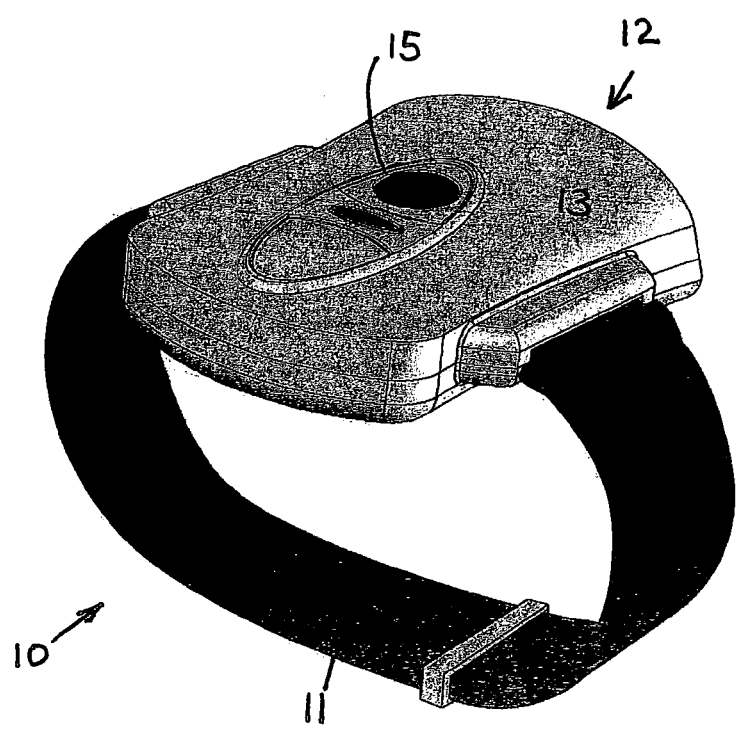
FIG. 4 is a schematic representation of a tracking device incorporating the identification apparatus of the invention.

Referring to FIG. 4, a tracking device comprising the identification apparatus for use in a particular application, the tracking of children will now be described. It is desirable to provide children with an easily-wearable tracking device, that can at least identify that the child that is wearing the device is a child that previously registered with the device. The tracking device 10 is incorporated into a watch, which is provided with a strap 11, for fitting the watch to a wrist of the child. (It will be appreciated that the tracking device may be incorporated into other items, and/or placed on other parts of the child's body, for example chest, head, arms, legs, back or hand/fingers.) The tracking device 10 comprises a measuring device 12 and an analysis system 13 contained in the housing of the watch. The analysis system 13 is designed to be removable from the watch, to therefore be reusable. The measuring device 12 comprises two electrodes, a first electrode (not shown) attached to the back of the watch, and a second electrode 15 provided in the top-side of the watch. The electrodes are designed to be removable from the watch to be disposable. In use, the watch is attached to a wrist of a child, using the strap 11. The strap is adjusted to bring the first electrode into contact with the skin of the child's wrist, and tightened to such an extent that the first electrode makes a firm, but comfortable, contact with the child's skin, and it is not possible to insert an object between the first electrode and the child's wrist. The child then places a finger of the other hand on the second electrode 15, and the electrodes measure preferably eight heart bio-potential biometrics of the child, each for a duration of approximately 30 seconds. The biometrics are analysed by the analysis system 13, as detailed above, and used to provide a set of previously-acquired waveform parameters of the child. The previously acquired waveform parameters are stored in a database accessible by the analysis system 13. Thus the child is registered with the tracking device 10.

When the tracking device 10 is to be used by the child, it is placed on the child as above. When a finger of the other hand is brought into contact with the second electrode 15, the electrodes measure preferably seven heart bio-potential biometrics of the child, each of approximately 4 seconds duration. The tracking device 10 may prompt the child to contact the second electrode, by for example emitting audio and/or visual signals. The biometric measurements are passed to the analysis system 13, which, for each biometric, analyses a bio-potential waveform, and calculates a set of waveform parameters, as previously described.

For each calculated waveform parameter, the analysis system 13 then determines a median of the waveform parameter. For each calculated waveform parameter, the analysis system 13 then compares the median calculated waveform parameter with the mean and standard deviation of a corresponding previously-acquired waveform parameter, as described above, to generate a score. The analysis system 13 then sums the scores generated for each waveform parameter, and compares the aggregate score with a pre-set score threshold, to determine information concerning the identity of the child wearing the tracking device 10. When the child wearing the tracking device 10 is a child who has registered with the device, for each waveform parameter, the deviation between the calculated waveform parameter and the corresponding previously-acquired waveform parameter will be small, generating small scores. The aggregate score will then be below the pre-set score threshold, and the analysis system 13 can then determine that the child now wearing the tracking device 10 is a child that previously registered with the device 10.

The tracking device 10 further comprises a location sensor, such as a global positioning system (GPS) location sensor. The location sensor is able to continually sense, or sense on demand, the location of the tracking device 10. When the apparatus determines that the child now wearing the device is the child that previously registered with the device, details of the location of the tracking device may be output to, for example, a remote receiver accessed by for example a parent or carer. The tracking device 10 further comprises a sensing device. The sensing device is able to continually sense, or sense on demand, whether or not the device 10 is being worn by the child, and if the device is not being worn by the child, emit an alarm signal to the remote receiver. A parent or carer is therefore able to determine that a child is wearing a tracking device, and the location of the tracking device and therefore the child. The sensing device may comprise two electrodes (separate from those of the biometric measuring device), and a resistance-based measurement may be used to determine whether or not the device 10 is being worn by the child.

The invention claimed is:

1. A method of determining information concerning the identity of an individual, the method comprising:
    measuring at least one biometric of the individual comprising at least one bio-potential waveform generated by the individual's heart,
    extracting a plurality of characteristics from the bio-potential waveform comprising two or more of an approximate location of a point of a P peak, an approximate location of a Q-point of a QRS peak system, an approximate location of an R-point of a QRS peak system, an approximate location of an S-point of a QRS peak system, or an approximate location of a point of a T peak,
    using the plurality of characteristics from the bio-potential waveform to calculate at least one waveform parameter comprising one or more of (an amplitude at an S-point minus an amplitude at an R-point) divided by (an amplitude at an approximate midpoint of a T peak minus an amplitude at an R-point), (an amplitude at an S-point minus an amplitude at an R-point) divided by (an amplitude at an approximate mid-point of a P peak minus an amplitude at an R-point), (an amplitude at a Q-point minus an amplitude at an R-point) divided by (an amplitude at an approximate mid-point of a P peak minus an amplitude at an R-point), or (an amplitude at a Q-point minus an amplitude at an R-point) divided by (an amplitude at an S-point minus an amplitude at an R-point), comparing at least one calculated waveform parameter with at least one previously acquired waveform parameter to generate a score, and using the score to determine information concerning the identity of the individual.

2. A method according to claim 1 in which the characteristics of the bio-potential waveform further comprise any of an approximate location of a mid-point of a P peak, an approximate location of a start-point of a P peak, an approximate location of an end-point of a P peak, an approximate location of a mid-point of a T peak, an approximate location of a start-point of a T peak, an approximate location of a start-point of a T peak, an interval between characteristics, an area of a peak, a full width at half maximum (FWHM) of a peak, a slope of a peak, a rise-time of a peak, a fall-time of a peak, a reflection of a peak, a DC off-set of the waveform, a drift of the waveform, a signal to noise ratio of the waveform, or an artefact of the waveform.

3. A method according to claim 1 in which the at least one calculated waveform parameter is compared with a plurality of previously-acquired waveform parameters of the individual to generate the score.

4. A method according to claim 1 in which the at least one calculated waveform parameter of the individual is compared with a plurality of previously-acquired waveform parameters of each of a plurality of individuals to generate the score to determine information concerning the identity of the individual comprising either information that the individual is one of the plurality of individuals or information that the individual is not one of the plurality of individuals.

5. A method according to claim 1 in which using the score comprises comparing the score with a pre-set score threshold to determine information concerning the individual.

6. A method according to claim 1 in which a plurality of waveform parameters are calculated, and using the score comprises summing the scores for the waveform parameters, and comparing the aggregate score with a pre-set score threshold to determine information concerning the individual.

7. A method according to claim 1 in which a plurality of waveform parameters are calculated, and the method comprises comparing a first calculated waveform parameter with at least one corresponding previously-acquired waveform parameter to generate a first score and using the first score to determine information concerning the identity of the individual, and if the determined information matches required information concerning the identity of the individual, terminating the method, or if the determined information does not match required information concerning the identity of the individual, comparing a second calculated waveform parameter with at least one corresponding previously-acquired waveform parameter to generate a second score and using the second score to determine information concerning the individual, or using the first and second scores to determine information concerning the individual, and continuing until either the determined information matches required information or each of the waveform parameters has been used.

8. A method according to claim 1 in which the at least one previously-acquired waveform parameter has been obtained from a previously-acquired heart bio-potential biometric of a register individual, and the method determines that the individual is the register individual or is not the register individual.

9. A method according to claim 1 in which at least one previously-acquired waveform parameter has been obtained from each of a plurality of previously-acquired heart bio-potential biometrics of a plurality of register individuals, and the method determines that the individual is one of the register individuals or is not one of the register individuals.

10. A method according to claim 1 in which for at least one waveform parameter, the method comprises calculating a plurality of values of the waveform parameter, determining a median of the plurality of values of the waveform parameter, and comparing the median of the at least one waveform parameter with at least one corresponding previously-acquired waveform parameter to generate the score.

11. A method according to claim 1 in which for each waveform parameter, the method comprises calculating a plurality of values of the waveform parameter, determining a median of the plurality of values of the waveform parameter, and comparing the median with a plurality of corresponding previously-acquired waveform parameters to determine the score, by calculating a difference between the median of the waveform parameter and a mean of the plurality of corresponding previously-acquired waveform parameters and dividing the difference by a standard deviation of the plurality of corresponding previously-acquired waveform parameters.

12. A method according to claim 1, wherein using the plurality of characteristics to calculate at least one waveform parameter comprises using the plurality of characteristics to calculate at least two waveform parameters comprising two or more of an approximate location of an R-point minus an approximate location of a mid-point of a P peak, an approximate location of a mid-point of a T peak minus an approximate location of an R-point, (an amplitude at an S-point minus an amplitude at an R-point) divided by (an amplitude at an approximate midpoint of a T peak minus an amplitude at an R-point), (an amplitude at an S-point minus an amplitude at an R-point) divided by (an amplitude at an approximate mid-point of a P peak minus an amplitude at an R-point), (an amplitude at a Q-point minus an amplitude at an R-point) divided by (an amplitude at an approximate mid-point of a P peak minus an amplitude at an R-point), or (an amplitude at a Q-point minus an amplitude at an R-point) divided by (an amplitude at an S-point minus an amplitude at an R-point).

13. A method according to claim 1, further comprising using the plurality of characteristics from the bio-potential waveform to calculate at least one other waveform parameter comprising at least one of: an approximate location of an S-point minus an approximate location of an R-point, an approximate location of an R-point minus an approximate location of a Q-point, an approximate location of an R-point minus an approximate location of a mid-point of a P peak, and an approximate location of a mid-point of a T peak minus an approximate location of an R-point.

14. An identification apparatus for determining information concerning the identity of an individual, the identification apparatus comprising:
a measurement device which measures at least one biometric of the individual comprising at least one bio-potential waveform generated by the individual's heart, and
an analysis system comprising an analysis device which analyzes the bio-potential waveform to extract a plurality of characteristics from the bio-potential waveform comprising two or more of am approximate location of a point of a P peak, an approximate location of a Q-point of a QRS peak system, an approximate location of an R-point of a QRS peak system, an approximate location of an S-point of a QRS peak system, or an approximate location of a point of a T peak,
a calculation device which uses the plurality of characteristics from the bio-potential waveform to calculate at least one waveform parameter comprising one or more of (an amplitude at an S-point minus an amplitude at an R-point) divided by (an amplitude at an approximate mid-point of a T peak minus an amplitude at an R-point), (an amplitude at an S-point minus an amplitude at an R-point) divided by (an amplitude at an approximate mid-point of a P peak minus an amplitude at an R-point), (an amplitude at a Q-point minus an amplitude at an R-point) divided by (an amplitude at an approximate mid-point of a P peak minus an amplitude at an R-point), or (an amplitude at a Q-point minus an amplitude at an R-point) divided by (an amplitude at an S-point minus an amplitude at an R-point), a comparator which compares at least one calculated waveform parameter with at least one previously-acquired waveform parameter to generate a score, and uses the score to determine information concerning the identity of the individual.

15. The identification apparatus of claim 14 in which the measurement device comprises two electrodes, a first electrode adapted to be placed in contact with a first portion of the individual, and a second electrode adapted to be placed in contact with a second portion of the individual.

16. A ECG acquisition/analysis device comprising an identification apparatus according to claim 14.

17. A tracking device comprising an identification apparatus according to claim 14.

18. An identification apparatus according to claim 14, wherein the calculation device uses the plurality of characteristics to calculate at least two waveform parameters comprising two or more of an approximate location of an R-point minus an approximate location of a mid-point of a P peak, an approximate location of a mid-point of a T peak minus an approximate location of an R-point, (an amplitude at an S-point minus an amplitude at an R-point) divided by (an amplitude at an approximate midpoint of a T peak minus an amplitude at an R-point), (an amplitude at an S-point minus an amplitude at an R-point) divided by (an amplitude at an approximate mid-point of a P peak minus an amplitude at an R-point), (an amplitude at a Q-point minus an amplitude at an R-point) divided by (an amplitude at an approximate mid-point of a P peak minus an amplitude at an R-point), or (an amplitude at a Q-point minus an amplitude at an R-point) divided by (an amplitude at an S-point minus an amplitude at an R-point).

19. An identification apparatus according to claim 14, wherein the calculation device uses the plurality of characteristics from the bio-potential waveform to calculate at least one other waveform parameter comprising at least one of: an approximate location of an S-point minus an approximate location of an R-point, an approximate location of an R-point minus an approximate location of a Q-point, an approximate location of an R-point minus an approximate location of a mid-point of a P peak, and an approximate location of a mid-point of a T peak minus an approximate location of an R-point.

* * * * *